United States Patent [19]

Sievers

[11] 4,439,470

[45] Mar. 27, 1984

[54] METHOD FOR FORMING TERNARY ALLOYS USING PRECIOUS METALS AND INTERDISPERSED PHASE

[75] Inventor: George K. Sievers, 1110 Kenwood St., Burbank, Calif. 91505

[73] Assignee: George Kelly Sievers, Burbank, Calif.

[21] Appl. No.: 376,107

[22] Filed: May 7, 1982

Related U.S. Application Data

[63] Continuation-in-part of Ser. No. 207,246, Nov. 17, 1980, Pat. No. 4,352,840.

[51] Int. Cl.$^3$ .................... C23C 11/00; C23C 13/00
[52] U.S. Cl. .................... 427/252; 427/250; 427/436; 428/615; 428/621; 428/627; 428/652
[58] Field of Search ............ 427/252, 250, 253, 202, 427/255.2, 255.3, 328, 372.2, 383.7, 383.9, 405, 419.1, 419.2, 419.7, 436, 437; 428/615, 621, 627, 652; 148/6.14, 6.3

[56] References Cited

U.S. PATENT DOCUMENTS

| | | | |
|---|---|---|---|
| 3,345,197 | 10/1967 | Martini et al. | 427/192 |
| 3,573,963 | 4/1971 | Maxwell | 427/427 |
| 3,677,789 | 7/1972 | Bungardt et al. | 427/383.9 |
| 3,692,554 | 9/1972 | Bungardt et al. | 427/252 |
| 3,961,910 | 6/1976 | Baladjanian et al. | 427/253 |
| 3,978,251 | 8/1976 | Stetson et al. | 427/253 |
| 3,979,273 | 9/1976 | Panzera et al. | 427/252 |
| 4,070,507 | 1/1978 | Stueber et al. | 427/252 |
| 4,156,042 | 5/1979 | Hayman et al. | 148/6.3 |

*Primary Examiner*—S. L. Childs
*Attorney, Agent, or Firm*—Wagner & Bachand

[57] ABSTRACT

Method is provided for improving performance alloy structures improved in corrosion and erosion and wear resistance characteristics by the incorporation of an interdispersed phase and a ternary or quaternhary alloy of platinum, rhodium or palladium, the alloy base metal and an alloying element such as aluminum in the structure surface with the use of relatively less of the precious metals for a given depth of case by virtue of the conjoint incorporation of the interdispersed phase.

31 Claims, No Drawings

METHOD FOR FORMING TERNARY ALLOYS USING PRECIOUS METALS AND INTERDISPERSED PHASE

REFERENCE TO RELATED APPLICATION

This application is a continuation-in-part of my copending application Ser. No. 207,246, filed Nov. 17, 1980, under the title Improved Interdispersed Phase Coatings Method, and the disclosure of that application is hereby incorporated by reference herein.

BACKGROUND OF THE INVENTION

This invention has to do with corrosion, erosion and wear resistant alloy structures, and methods therefor. More particularly, the invention relates to more economical diffusion coating of alloys having as base metals iron, cobalt and nickel, while obtaining benefits of increased resistance to corrosion characteristic of rhodium or platinum ternary alloys, e.g. with aluminum and the alloy base metal.

The invention is further concerned with improvements in specific properties of such ternary alloy systems by the incorporation of discrete particulate matter, such as alumina, or a hard carbide such as tungsten carbide for their specific erosion or wear characteristic. Remarkably, the use of the discrete particulate matter enables reductions in the quantity of rhodium or platinum precious metal needed to form a diffusion coated case of adequate depth on the alloy structure being treated, so that the addition of the erosion and wear properties resulting from incorporation of the mentioned discrete particulate matter, has the further and unexpected benefit of lowering the precious metal requirement and thus the material casts of the product, enabling a widely inproved product at lower cost.

In the production of diffusion alloy coatings such as are employed on high performance metal parts, including turbine vanes and blades, pump parts, and other parts subject to unusual demands for erosion, corrosion and wear resistance it is desirable to produce such coatings on a wide variety of structures, by which term herein is meant a shaped article in an intermediate or final configuration for its intended use, to do so rapidly and repeatably so as to obtain superior performance. The incorporation of various discrete interdispersed phase-forming materials into diffusion coatings enables obtention of individually tailored properties responsive to the selective inclusion, in a controlled interdispersion, of refractory oxide, nitride or hard carbide material and/or elemental metal additives, which are kept and remain interdispersed, i.e. remain as discrete particulate material in the interdiffusion layer, with a high degree of control as to location, concentration, and, thereby, as to properties of the final product.

PRIOR ART

It is known to form intermetallic compounds and alloys on high performance parts such as turbine blades and blades by subjecting the surface of the part to a diffusion of one or more constituents of a diffusion pack to form an interdiffusion layer, sometimes referred to as a diffusion coating. Typically, the pack comprises the one or several metals to be diffused, frequently aluminum, aluminum oxide, a halogen and possibly other materials depending on the particular objective of the diffusion. The pack is heated for long periods at very high temperatures, and an intermetallic compound is formed typically both outwardly and inwardly of the part original surface. This kind of coating can lend extreme corrosion resistance properties to structurally superior, more easily formed, less costly metals, is renewable, and provides a product of improved properties.

A related approach to improving specifically the corrosion resistance of high performance alloy structures is disclosed in U.S. Pat. No. 3,961,910, issued June 8, 1976 to Baladjanian and Clark. There, use of rhodium preplated and diffused into the alloy structure, followed by aluminum diffusion from an aluminizing pack resulted in the formation of a ternary alloy of aluminum, rhodium and the base metal, e.g. nickel, which ternary alloy was found to be especially effective against corrosion. Rhodium is expensive, however, and use of sufficient amounts to develop an adequate depth or thickness for practical application, the coating "case" necessitated use of rhodium plate at from 5 to 35% of the intended depth of diffusion coating. Additionally, the corrosion benefits were related to the development of a "spike" of rhodium concentration in the coating which is process related and limits processing flexibility.

In addition, platinum was found to be deficient in the Baladajanian process and product, but the properties of platinum are such that in other processes its use is highly desired. Similarly, use of palladium is sometimes useful but its use is not suggested in the Baladjanian et al patent.

Although greatly improved in corrosion resistance, the Baladjanian et al products are not especially resistant to erosion and wear. Increasingly, the need in turbine components, valving, and fluid control equipment of all types is for erosion and wear resistance, as well as corrosion resistance, since fuels and other fluids with which these parts must deal frequently contain particles and larger detritus, which impinge on the wearing surfaces, exacerbating the chemical corrosion problem by mechanically destroying the corrosion resistant layer.

Moreover, the cost of obtaining adequate depth of case using rhodium technology as disclosed by Baladjanian et al, is such that only limited markets where performance requirements overrode cost, such as aircraft engines, were available. Promising markets such as power plant turbines, oil field equipment and the like were essentially foreclosed on cost grounds. By the present invention, however, the quantities of precious metal, such as rhodium, platinum or palladium required is substantially reduced, lowering costs appreciably, for the same depth of diffusion coating case.

This benefit is unexpectedly realized from the use of an added discrete particulate component to the diffusion coating which replaces metallic phase in the coating with an interdispersed phase, thus reducing the need for precious metal while maintaining corrosion resistance, and as well adds its own distinctive beneficial properties, such as erosion and wear resistance. The use of discrete particulate matter in diffusion coatings is broadly known, although not in connection with improving the corrosion resistance of an alloy structure while obtaining the case depth with the use of reduced amounts of precious metal.

U.S. Pat. No. 3,345,197, to Martini et al, teaches the incorporation by codiffusion with aluminum, of undissolved materials, or interdispersed phases such as aluminum oxide, for particular purposes involved with improvements in the properties of the final coating. To accomplish this Martini finely grinds the aluminum oxide, e.g. to a size as fine as 5 microns, and mixes the resultant "colloidal" material with aluminum to form a powder, and then heats the part in the powder to achieve an aluminide coating with interdispersed aluminum oxide, some of which has migrated out of the powder into the surface of the part. Martini is limited in his pack composition to the extremely finely ground aluminum oxide, and to the use of aluminum as the diffusing metal. Thus limited, the Martini method is of limited utility, although the product realized has potential.

Important among the disadvantages of Martini is the alteration of conventional pack compositions, as by requiring quantities of finely ground aluminum oxide as a necessary part of the pack, at the risk of not achieving the desired incorporation of refractory oxide material in the final coating, where the particle size is excessive. The flexibility of result in Martini is quite limited, since incorporation of the oxide from within the pack is restricted to but one refractory material and a single value of refractory material density in the diffusion coating and dependent on the original pack composition.

SUMMARY OF THE INVENTION

These problems are obviated by the techniques disclosed in my co-pending application, Ser. No. 207,246, filed Nov. 17, 1980, wherein precoating of the structure surface to be treated by a diffusion pack enabled diffusion into the structure surface of materials such as hard carbides, refractory oxides, and certain metals, all to be maintained as discrete particles within the diffusion coating, and without use of specially sized oxides in the diffusion pack.

Nonetheless, the resulting products are desirably further improved in corrosion resistance. There is therefore a need in the art for corrosion, erosion and wear resistant structures, and for methods for imparting these qualities simply, repeatably, and more economically than has been possible heretofore.

It is accordingly an object of the present invention to provide improvements in diffusion coating technology overcoming the limitations and disadvantages of the prior art, and to provide the resulting products having tailored chemical corrosion resistance with reduced use of precious metals, and erosion and wear properties characteristic of particular additives.

The foregoing and other objects of the invention to become apparent hereinafter, are realized in the method of forming on a nickel, cobalt or iron base metal structure a diffusion coating case of a preselected thickness and containing a precious metal ternary alloy and an interdispersed phase to impart improved corrosion, erosion and wear properties to a surface of the structure, which includes applying onto the structure surface an adherent layer of a precious metal in an amount less than normally required for a case of the preselected depth, applying a layer of an interdispersed phase-forming discrete particulate matter to the surface in a predetermined amount, forming a ternary alloy of the base metal, the precious metal and an alloying element by interdiffusing under nonoxidizing conditions the layer-applied structure surface from a diffusion pack containing the alloying element, and distributing and maintaining the predetermined amount of interdispersed phase-forming matter as discrete particulate matter through the ternary alloy sufficient to increase the thickness of the ternary alloy containing case on the structure surface to the preselected thickness, whereby the case has the corrosion resistance properties characteristic of the ternary alloy, and the erosion and wear properties characteristic of the interdispersed phase matter, with the use of reduced amounts of the precious metal.

In particular embodiments, the method includes: selecting aluminum as the alloying element; selecting rhodium, platinum and/or palladium as the precious metal; applying the precious metal to the surface by depositing from a bath thereof or by vapor deposition or by physical deposition; subjecting if desired, the surface applied precious metal to heating for a time and at a temperature prediffusing the precious metal into the surface; and maintaining a substantially oxygen-free atmosphere at the surface during the precious metal heating.

In preferred embodiments, the invention includes maintaining the predetermined amount of interdispersed phase-forming discrete particulate matter separate from the pack constituents and relatively richly concentrated at the structure surface, e.g. as an adherent film on the structure surface, suitably by binding the discrete particulate matter into a film with an organic binder; selecting as the interdispersed phase-forming matter a hard carbide, a silicide, oxide or nitride, e.g. selecting as the hard carbide tungsten carbide, tantalum carbide, zirconium carbide, titanium carbide or chromium carbide, as the silicide molybedenum disilicide, or as the nitride silicon nitride; or selecting as the interdispersed phase-forming matter a metal having an atomic number of 24 or higher and which does not form ternary alloys with the precious metal and the base metal, e.g. as the interdispersed phase-forming matter a metal such as tungsten, tantalum, molybdenum, zirconium, titanium, hafnium, yttrium or chromium; or selecting as the interdispersed phase-forming matter a refractory oxide such as zirconia, alumina, titania, magnesia, yttria or hafnia refractory oxides having a particle size of less than about 25 microns.

In a particularly preferred embodiment, the invention contemplates the method of forming on a nickel or cobalt base metal structure a diffusion coating case of a preselected thickness and containing a rhodium or platinum ternary alloy and an interdispersed phase to impart improved corrosion, erosion and wear properties to a surface of the structure, which includes applying onto the structure surface a first adherent layer of rhodium and/or platinum in an amount less than normally required for a case of the preselected depth, applying over the first adherent layer a second adherent layer of an interdispersed phase-forming discrete particulate matter onto the surface in a predetermined amount, forming a ternary alloy of the base metal, the platinum or rhodium, and aluminum by immersing the layer-applied structure surface in an aluminizing pack containing a refractory oxide and aluminum and diffusing under non-oxidizing conditions and simultaneously distributing the predetermined amount of interdispersed phase-forming matter as discrete particulate matter through the ternary alloy sufficient to increase the thickness of the ternary alloy containing case on the structure surface to the preselected thickness, whereby the case has the corrosion resistance properties characteristic of the ternary alloy, and the erosion and wear properties characteristic of the interdispersed phase matter, with the use of reduced amounts of the rhodium or platinum.

As in the previous embodiments, in this embodiment the method further includes applying the rhodium or platinum metal to the surface by depositing from a bath or vapor thereof, or by physical deposition; maintaining the predetermined amount of interdispersed phase-forming discrete particulate matter relatively richly concentrated at the structure surface; binding the discrete particulate matter into an adherent layer on the structure surface with a binding agent, e.g. with an organic binder as binding agent; selecting as the discrete particulate matter tungsten carbide, tantalum carbide, zirconium carbide, titanium carbide or chromium carbide among the hard carbides, tungsten, tantalum, molybdenum, zirconium, titanium, hafnium, yttrium or chromium among metals having an atomic number above 24 which do not form ternary alloys with the precious metal and alloying element under the operating conditions of the method, and selecting as a refractory zirconia, alumina, titania, magnesia, yttria or hafnia refractory oxides having a particle size of less than about 25 microns. One or more of the mentioned discrete particulate matter elements and compositions can be used from the foregoing groups, and from various combinations of groups in a particular application of the invention, depending on the final properties desired in the product.

In a highly preferred embodiment, the invention comprises the method of forming on a nickel or cobalt base metal structure a diffusion coating case of a preselected thickness and containing a rhodium or platinum ternary alloy and an interdispersed phase to impart improved corrosion, erosion and wear properties to a surface of the structure, which includes depositing onto the structure surface a first adherent layer of rhodium and/or platinum to a depth equal to from 2.5 to 17% of the ultimate case depth and less than normally required for a case of the preselected depth, applying over the first adherent layer a second adherent layer of an interdispersed phase-forming discrete particulate matter and an organic binder onto the surface in a predetermined amount, forming a ternary alloy of the base metal, the platinum or rhodium, and aluminum by immersing the layer-applied structure surface in an aluminizing pack containing a refractory oxide and aluminum and diffusing under non-oxidizing conditions and simultaneously distributing the predetermined amount of interdispersed phase-forming matter as discrete particulate matter through the ternary alloy sufficient to increase the thickness of the ternary alloy containing case on the structure surface to the preselected thickness, whereby the case has the corrosion resistance properties characteristic of the ternary alloy, and the erosion and wear properties characteristic of the interdispersed phase matter, with the use of reduced amounts of the rhodium or platinum.

The invention further contemplates provision of new compositions of matter shaped into alloy structures of final or intermediate configuration. Thus there is provided in accordance with the invention, a cobalt, nickel or iron base alloy structure having a diffusion coating, the coating comprising a ternary alloy of aluminum, base metal and rhodium, platinum and/or palladium effective to improve the corrosion resistance properties of the structure, and distributed within the coating an interdispersed phase of discrete particulate matter in an amount effective to improve the erosion and wear properties of the structure without reducing the corrosion resistance imparted by the ternary alloy. Preferably, the ternary alloy consists of rhodium, nickel or cobalt and aluminum, or platinum, nickel or cobalt and aluminum. Quaternary alloys of e.g. nickel or cobalt, platinum, rhodium and aluminum are obtained where two precious metals are used. The term "ternary" herein refers to alloys of three (ternary alloy per se), or four (sometimes herein referred to as quaternary alloys) or more metals, as obtained by the present method. Typically, the alloy structure further comprises discrete particulate matter in the form of a refractory oxide, such as aluminum oxide or zirconium oxide, or a hard carbide, particularly tungsten carbide., or a metal such as tungsten, tantalum, molybdenum, zirconium, titanium, hafnium, yttrium, or chromium.

DESCRIPTION OF THE PREFERRED EMBODIMENTS

"Interdispersed" and its cognitives herein refer to a condition of a particulate higher atomic number metal, i.e. having an atomic number of 24 or above, or a refractory oxide, nitride, or silicide material, or a hard carbide material, being incorporated as a discrete entity defining a separate phase within a diffusion-formed alloy or intermetallic compound.

EXAMPLE I

A nickel base alloy structure containing chromium, cobalt, molybdenum, tantalum, aluminum and titanium, was cleaned for plating and electroplated with 0.00004 inch of rhodium (about 10% of the ultimate case depth) from a rhodium sulfate solution. The part was then coated to a thickness of about 0.010 inch with a slurry of mixed 5 and 10 micron aluminum oxide particles dispersed in an acrylic lacquer. After the coating dried, the part was packed in a diffusion pack comprising 9% aluminum mixed with 91% aluminum oxide of −100 mesh, and a small amount of ammonium chloride. The pack was heated at 1900° F. for 4 hours. After the part cooled the coating was examined and found to be smooth, approximately 0.0035 inch in depth. Aluminum oxide particles were included in large numbers in the outer half of the coating.

In subsequent testing for erosion and wear by subjecting the part to a fluid stream containing fine particulate, it is noted that erosion is reduced substantially over an uncoated control part. Similar testing in a corrosive environment with sulfur-laden jet fuel reveals that corrosion resistance is excellent indicating the presence of an effective ternary alloy within the coating. Lower amounts of rhodium, e.g. 2.5% of the intended ultimate coating depth are effective when applied and followed by the mentioned interdiffusion in accordance with the invention, and use of more than 17.5% rhodium, platinum, rhodium-platinum, or palladium is not usually required in accordance with the present method to obtain effective corrosion resistance by ternary or quaternary alloy formation and a case depth of adequate size unlike precious metal diffusion coatings effected without conjoint use of an interdispersed phase.

EXAMPLE II

Example I is duplicated but using both rhodium electroplate (0.00001 inch thick) and platinum electroplate (0.00004 inch) atop the rhodium. Processing is identical. The resultant part has a coating containing a quaternary alloy of nickel, rhodium, platinum and aluminum. Simultaneous fluid abrasion and corrosion testing reveals the coating has excellent properties against these environments.

EXAMPLE III

A conventional diffusion pack comprising per 100 parts by weight, 6 parts of aluminum powder, −200 mesh, and 94 parts of aluminum oxide powder, 100 to 325 mesh, is prepared. A jet engine blade comprised of nickel superalloy of the percent composition:

0.12 Carbon
12.5 Chromium
4.2 Molybdenum
2.0 Columbium
0.8 Titanium
6.1 Aluminum
0.012 Boron
0.1 Zirconium
Bal. Nickel is surface deposited with rhodium by physical deposition to a depth of 0.00001 inch. The covered surface is then coated with an adherent layer of 10 micron powder aluminum oxide, by painting onto the part the oxide suspended in a lacquer binder. After the binder dries, the aluminum oxide is firmly bound to the part surfaces and the part, thus coated, is immersed in the mentioned pack. The pack is heated to 1050°–1100° Centigrade, in a hydrogen atmosphere, for 4–5 hours. A second engine blade of identical composition, also placed in the pack during the heat, is also diffused but without first precoating with rhodium, as a Control. Microsections of the Example III and Control parts are compared by microscopic examination. Comparison of the Example and Control parts reveals that each has a diffusion coating which extends both inwardly and outwardly from the nominal surface of the part before diffusion and exhibits an oxide dispersion characterized by uniform distribution of an interdispersed phase of aluminum oxide particulate, which will greatly enhance erosion resistance of the part. The Example part is microscanned for the presence of alloy of rhodium, nickel and aluminum and its presence is confirmed. Corrosion resistance to sulfurous jet fuel is excellent. Simultaneous subjection of the part to carbon particulates shows excellent resistance to erosion and wear in comparison with an untreated part of like configuration.

EXAMPLE IV

Example III is duplicated using as the pack composition, in lieu of the aluminum powder in the pack, titanium powder, −200 mesh (Example IVa); boron powder, −325 mesh (Example IVb); and silicon powder, −200 mesh (Example IVc). The interdispersed material is also varied using tungsten carbide (Example IVd), tantalum carbide (Example IVe), zirconium carbide (Example IVf); titanium carbide (Example IVg); silicon carbide (Example IVh); chromium carbide (Example IVi). The interdispersed material is also varied using tungsten (Example IVj), tantalum (Example IVk), molybedenum (Example IVl); zirconium (Example IVm); titanium (Example IVn); hafnium (Example IVo); yttrium (Example IVp); molybedenum disilicide (Example IVq); silicon nitride (Example IVr); all powdered and held on with organic binder, and plated-on chromium (Example IVs) as the metal coating on the blade part; and in lieu of the aluminum oxide refractory coating on the part, zirconia (Example IVt); titania (Example IVu); magnesia (Example IVw); yttria (Example IVx); and hafnia (Example IVz). The parts were first surface covered with an adherent layer of rhodium, platinum or palladium, in an amount less than normally required for the case depth obtained. The rhodium is not required to be prediffused into the part being treated, and this extra step is generally avoided. The anti-corrosion benefits of the rhodium addition are realized whether or not the rhodium is relatively richly concentrated near the interface of the diffusion coating layer an the part substrate.

The products of Examples IVa-z are improved in corrosion, erosion and/or wear performance over controls produced at the same time, but without use of the rhodium, platinum or palladium coating, or maintaining the particular interdispersed material at the interdiffusion locus by the expedient of coating the part surface with the interdispersed material, in advance of subjecting the part to pack diffusion. Also, it will be noted that the pack compositions need not be specially formulated, either as to constituents or particle size of constituents. The disclosed method therefore affords a product of variously improved properties with only the coating on the part to be diffused being varied, for a given pack composition.

The reason for the improvement in properties of a part diffused with an interdispersed phase over a part without such a phase appears to be that the dispersed phase can stabilize a protective oxide phase formed in part use, provide some protection against impinging particles, or change the macroscopic hardness of the coating. The improvement in corrosion properties of an interdiffused part over a part without such a phase with reduced amounts of precious metal is evidently resultant from the formation of ternary or quaternary alloys of the precious metals, the base metal, e.g. nickel, cobalt or iron, and aluminum form the diffusion pack and the replacement of some of the coating metallic phase with the interdispersed phase.

The interdispersed phase may be a refractory oxide, as indicated above whereby the property improvements are typically improved erosion resistance, a hard carbide, nitride or silicide whereby the property improvements are typically wear resistance, or a metal whereby the property improvements are typically in corrosion resistance.

Typical pack diffusion conditions for carrying out the present method are temperatures between 760° C. to 1100° C. and heating for 2 to 20 hours in an inert, oxygen-free atmosphere.

Suitable binders, if used, are synthetic organic polymeric materials suitably soluble in organic vehicles which will evaporate at a satisfactory rate for formation of adherent coating on a part to be diffused, or a portion of such part, where specifically varied properties are desired.

The term "nickel base," "cobalt base," and "iron base" respectively refer to alloys in which nickel, cobalt, or iron is the largest single ingredient, in weight percent, although not necessarily a major weight amount of the entire alloy. Suitable alloys herein contain in addition to the base metal at 35% and more, effective, minor amounts by weight of one or more of tungsten, manganese, molybdenum, iron, nickel, cobalt, carbon, vanadium, titanium, aluminum, tantalum, columbium, chromium, boron, and/or zirconium and the like conventionally present in superalloys.

I claim:

1. Method of forming on a nickel, cobalt or iron base metal structure a diffusion coating case of a preselected thickness and containing a precious metal ternary alloy and an interdispersed phase to impart improved corrosion, erosion and wear properties to a surface of said structure, which includes applying onto said structure surface an adherent layer of a precious metal in an amount less than normally required for a case of said preselected depth, applying a layer of an interdispersed phase-forming discrete particulate matter to said surface in a predetermined amount, forming a ternary alloy of said base metal, said precious metal and an alloying element by interdiffusing under nonoxidizing conditions said layer-applied structure surface from a diffusion pack containing said alloying element, and distributing said predetermined amount of interdispersed phase-forming matter as a separate entity comprising discrete particulate matter through said ternary alloy sufficient to increase the thickness of said ternary alloy containing case on said structure surface to said preselected thickness, whereby said case has the corrosion resistance properties characteristic of said ternary alloy, and the erosion and wear properties characteristic of said interdispersed phase matter.

2. The method according to claim 1, including also selecting an iron base alloy structure as said structure to be diffusion coated.

3. The method according to claim 1, including also selecting a cobalt base alloy structure as said structure to be diffusion coated.

4. The method according to claim 1, including also selecting a nickel base alloy structure as said structure to be diffusion coated.

5. The method according to claim 1, including also selecting aluminum as said alloying element.

6. The method according to claim 1, including also selecting rhodium as said precious metal.

7. The method according to claim 1, including also selecting platinum as said precious metal.

8. The method according to claim 1, including also selecting palladium as said precious metal.

9. The method according to claim 1, including also applying said precious metal to said surface by depositing from a bath thereof.

10. The method according to claim 1, including also applying said precious metal to said surface by vapor deposition.

11. The method according to claim 1, including also applying said precious metal to said surface by physical deposition.

12. The method according to claim 1, including also subjecting said surface applied precious metal to heating for a time and at a temperature prediffusing said precious metal into said surface.

13. The method according to claim 12, including maintaining a substantially oxygen-free atmosphere at said surface during said precious metal heating.

14. The method according to claim 1, including also maintaining said predetermined amount of interdispersed phase-forming discrete particulate matter separate from said pack constituents and relatively richly concentrated at said structure surface.

15. The method according to claim 14, including maintaining said discrete particulate matter as an adherent film on said structure surface.

16. The method according to claim 15, including also binding said discrete particulate matter into a film with an organic binder.

17. Method according to claim 1, including also selecting a refractory oxide, a hard carbide, a silicide, or nitride as said interdispersed phase-forming matter.

18. The method according to claim 17, including also selecting as the hard carbide, tungsten carbide, tantalum carbide, zirconium carbide, titanium carbide or chromium carbide, as the silicate, molybdenum disilicide, or as the nitride, silicon nitride.

19. Method according to claim 1, including also selecting a metal having an atomic number of 24 or higher and which does not form ternary alloys with said precious metal and said base metal as said interdispersed phase-forming matter.

20. The method according to claim 19, including also selecting as said interdispersed phase metal tungsten, tantalum, molybdenum, zirconium, titanium, hafnium, yttrium or chromium.

21. Method according to claim 1, including also selecting as said interdispersed phase-forming matter zirconia, alumina, titania, magnesia, yttria or hafnia refractory oxides having a particle size of less than about 25 microns.

22. Method of forming on a nickel or cobalt base metal structure a diffusion coating case of a preselected thickness and containing a rhodium or platinum ternary alloy and an interdispersed phase to impart improved corrosion, erosion and wear properties to a surface of said structure, which includes applying onto said structure surface a first adherent layer of rhodium and/or platinum in an amount less than normally required for a case of said preselected depth, applying over said first adherent layer a second adherent layer of an interdispersed phase-forming discrete particulate matter onto said surface in a predetermined amount, forming a ternary alloy of said base metal, said platinum or rhodium, and aluminum by immersing said layer-applied structure surface in an aluminizing pack containing a refractory oxide and aluminum and diffusing under non-oxidizing conditions and simultaneously distributing said predetermined amount of interdispersed phase-forming matter as discrete particulate matter through said ternary alloy sufficient to increase the thickness of said ternary alloy containing case on said structure surface to said preselected thickness, whereby said case has the corrosion resistance properties characteristic of said ternary alloy, and the erosion and wear properties characteristic of said interdispersed phase matter.

23. The method according to claim 22, including also applying said rhodium or platinum metal to said surface by depositing from a bath or vapor thereof.

24. The method according to claim 23, including also applying said rhodium or platinum to said surface by physical deposition.

25. The method according to claim 23, including also maintaining said predetermined amount of interdispersed phase-forming discrete particulate matter and relatively richly concentrated at said structure surface.

26. The method according to claim 25, including binding said discrete particulate matter into an adherent layer on said structure surface with a binding agent.

27. The method according to claim 26, including also binding said discrete particulate matter with an organic binder as binding agent.

28. The method according to claim 27, including also selecting as said discrete particulate matter tungsten carbide, tantalum carbide, zirconium carbide, titanium carbide or chromium carbide.

29. The method according to claim 27, including also selecting as said discrete particulate matter tungsten, tantalum, molybdenum, zirconium, titanium, hafnium, yttrium or chromium.

30. The method according to claim 27, including also selecting as said discrete particulate matter zirconia, alumina, titania, magnesia, yttria or hafnia refractory oxides having a particle size of less than about 25 microns.

31. Method of forming on a nickel or cobalt base metal structure a diffusion coating case of a preselected thickness and containing a rhodium or platinum ternary alloy and an interdispersed phase to impart improved corrosion, erosion and wear properties to a surface of said structure, which includes depositing onto said structure surface a first adherent layer of rhodium and/or platinum to a depth equal to from 2.5 to 17% of the ultimate case depth and less than normally required for a case of said preselected depth, applying over said first adherent layer a second adherent layer of an interdispersed phase-forming discrete particulate matter and an organic binder onto said surface in a predetermined amount, forming a ternary alloy of said base metal, said platinum or rhodium, and aluminum by immersing said layer-applied structure surface in an aluminizing pack containing a refractory oxide and aluminum and diffusing under non-oxidizing conditions and simultaneously distributing said predetermined amount of interdispersed phase-forming matter as discrete particulate matter through said ternary alloy sufficient to increase the thickness of said ternary alloy containing case on said structure surface to said preselected thickness, whereby said case has the corrosion resistance properties characteristic of said ternary alloy, and the erosion and wear properties characteristic of said interdispersed phase matter.

* * * * *